(12) United States Patent
Raynal et al.

(10) Patent No.: US 7,727,311 B2
(45) Date of Patent: Jun. 1, 2010

(54) INSTALLATION AND METHOD FOR MIXING AND DISTRIBUTING A LIQUID PHASE AND A GASEOUS PHASE

(75) Inventors: Ludovic Raynal, Oullins (FR); Eric Lemaire, Morance (FR); Jean-Louis Ambrosino, Ternay (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 1259 days.

(21) Appl. No.: 11/223,142

(22) Filed: Sep. 12, 2005

(65) Prior Publication Data

US 2006/0060083 A1 Mar. 23, 2006

(30) Foreign Application Priority Data

Sep. 10, 2004 (FR) .................................. 04 09661

(51) Int. Cl.
*B01D 47/14* (2006.01)
*B01D 53/14* (2006.01)

(52) U.S. Cl. .............................. 95/187; 95/199; 95/211; 95/235; 95/236; 96/234; 96/290; 208/146; 208/213; 423/574.1; 423/243.06; 423/547

(58) Field of Classification Search .................. 95/187, 95/199, 210–213, 223–224, 235, 236; 96/234, 96/271–273, 290–297, 322; 261/114.5
See application file for complete search history.

(56) References Cited

U.S. PATENT DOCUMENTS

| | | | | |
|---|---|---|---|---|
| 2,709,128 A * | 5/1955 | Krause | ........................ | 422/310 |
| 3,511,027 A * | 5/1970 | Rogacki et al. | ............... | 95/162 |
| 3,904,743 A * | 9/1975 | Urban | ...................... | 423/567.1 |
| 4,079,117 A * | 3/1978 | Butwell | ....................... | 423/228 |
| 4,307,067 A | 12/1981 | Tagawa et al. | | |
| 6,063,352 A * | 5/2000 | Risse et al. | ............. | 423/243.06 |
| 6,306,357 B1 | 10/2001 | Simonson et al. | | |
| 6,776,974 B1 * | 8/2004 | Burmaster et al. | ........ | 423/574.1 |
| 6,824,675 B2 * | 11/2004 | Boyer et al. | ................. | 208/146 |
| 6,881,389 B2 * | 4/2005 | Paulsen et al. | ............... | 423/210 |
| 7,238,329 B2 * | 7/2007 | Boyer et al. | ................. | 422/194 |

FOREIGN PATENT DOCUMENTS

DE 3733319 A1 * 4/1989
GB 710564 * 6/1954

* cited by examiner

*Primary Examiner*—Duane Smith
*Assistant Examiner*—Ives Wu
(74) *Attorney, Agent, or Firm*—Millen, White, Zelano, Branigan, P.C.

(57) ABSTRACT

Installation for gas treatment by a liquid phase comprising
a) a column (C) that comprises means (1) for introducing gas at one end of said column, means (9) for drawing off gas from the other end of column (C) and, from upstream to downstream in the direction of circulation of the liquid phase:
a first internal (2) that comprises means for distribution of a liquid phase,
a first bed (6) that comprises a packing or catalytic particles,
a second internal (3) that comprises means for separating liquid/gas mixture (19, 20) that is obtained from first bed (6), first means (32, 4) for collecting and evacuating the separated liquid phase, means (100) for passing through internal (3) of the treated gas, and distribution means (31, 101) of a liquid phase with said gas,
a second bed (8),
second means (10) for collecting and evacuating the liquid phase at the lower outlet of column (C),
b) Means for recycling the collected liquid phase.

25 Claims, 4 Drawing Sheets

Figure 1:
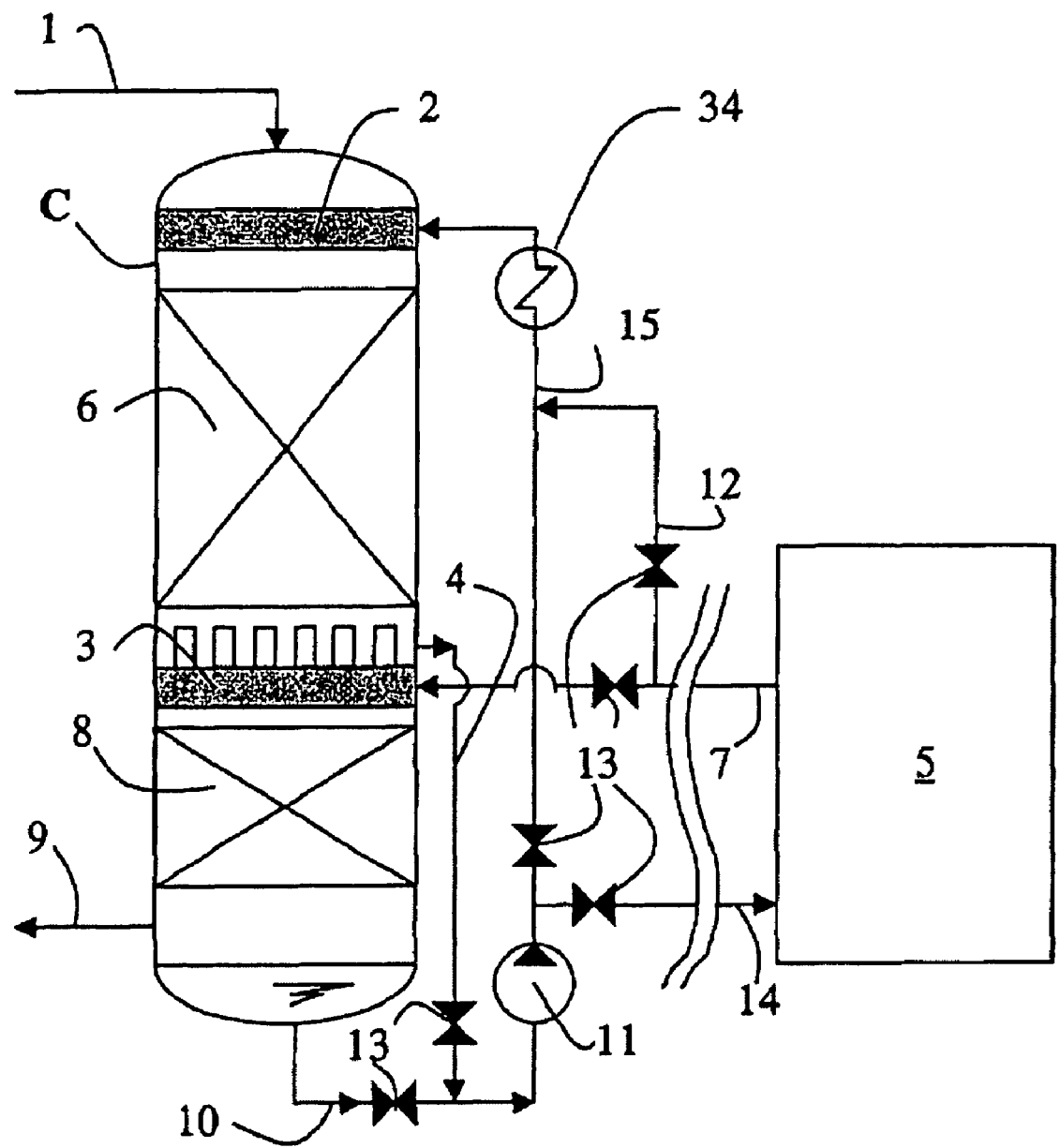

INSTALLATION AND METHOD FOR MIXING AND DISTRIBUTING A LIQUID PHASE AND A GASEOUS PHASE

FIELD OF THE INVENTION

This invention relates to a gas treatment installation and a process for using said installation in which a thorough mixing between a gaseous phase and a liquid phase, an essentially uniform radial distribution of said mixture within said installation, and in addition an optimum use of the scrubbing liquid are desired.

This invention generally finds its application in all the processes for treatment of a gaseous phase by a liquid in at least one stage for separation, purification or chemical transformation. The impurities can be gas compounds (CO2, H2S, etc. . . . ), solid particles (catalyst fines, dust, flyash, etc. . . . ) or liquids (droplets of chemical products, liquid sulfur, etc. . . . ).

This invention finds its application more particularly in the field of scrubbing acid gases that are obtained from a gas production field or gas storage site offshore or on land or present within a refinery. In this description below, the particular case of treating acid gases is described. Of course, this example of application does not at all restrict the field of application of this invention. In particular, this method can be used in any type of process for purification of the gaseous phase in which a thorough mixing and a uniform distribution of gaseous phases and liquid phases are necessary.

In the gas treatment processes, the object is to maximize the contact zones between the gas that is to be treated and at least one scrubbing liquid (of aqueous or organic solvent type). An improved contact makes possible an effective transfer of material from gas to liquid. In particular, the acid components of the $H_2S$, $SO_2$, $CO_2$, COS, CS2 and RSH type are indicated. These components may or may not react in the liquid phase; chemical or physical absorption respectively is then mentioned. The sizing of the column, inside of which the treatment is done, commonly called contactor in the field, is very generally determined based on the effective surface area that is necessary for an effective material transfer. In a known way, this area is furthermore substantially increased thanks to the use of packings that may be of the bulk, structured, monolithic or solid foam type. The packings are fed with liquid or gas by distribution systems or internals, also called distributor plates, whose main objective is to ensure the most uniform spraying possible on the packing surface. Plates such as those used in the distillation columns can also be used. The known devices, however, generally do not guarantee a thorough mixing between the phases that are present and/or an optimum use of the scrubbing liquid.

PRIOR ART

European Patent Application EP 1,180,393 or its equivalent US 2002/0021991 now U.S. Pat. No. 6,824,675 B2 by Boyer et al. issued Nov. 30, 2004 proposes a device that comprises a liquid compartment that is pierced by shafts for the passage of a gaseous phase that is introduced upstream in the column, whereby this arrangement makes it possible to obtain a suitable quality of the mixture and to monitor the liquid level within the distributor plate.

According to another principle described in Patent FR 2,820,430 or its equivalent U.S. Pat. No. 6,666,908, a process diagram is proposed that allows the scrubbing of the $CO_2$ and/or $H_2S$ in a first absorption column, then the scrubbing of sulfur-containing compounds RSH, COS or $CS_2$ in a second column that operates at a lower temperature.

In addition to the spraying quality, a second desired quality is the flexibility of operation; it thus is desired to have a system that operates with the widest range possible of liquid and/or gas flow. In the case of simple systems, this range is generally limited for the liquid by a ratio from 1 to 3, in some cases up to 10, between the possible minimum flow and maximum flow. A third quality relates to the quality of the mixture between the two gas and liquid phases.

DESCRIPTION OF THE INVENTION

This invention describes an alternative system whose use allows a uniformity of distribution, regardless of the conditions of use, in particular even when the vertical nature of the distribution column is not completely ensured, for example for use on an off-shore platform or on a boat. This system also operates over a very wide range of operation in liquid flow, i.e., a flow ratio from 1 to more than 20, and even more than 25. Finally, contrary to the majority of the devices of the prior art, it promotes a very good contact between the two liquid and gaseous phases, which exhibits in particular the advantage of reducing the packing volume located downstream from the distributor plate. In addition, the combination of the two preceding factors allows a reduction in size of the column, which is reflected by a significant reduction of its cost, in particular for the applications in the field, generally under high pressure. Finally, the invention makes it possible to maintain a good liquid/gas distribution in the entire column and optimally to use the scrubbing liquid, in particular by recycling and/or use of several suitable scrubbing liquids.

This invention can be applied to a standard counter-current operation or to a standard downward co-current gas/liquid operation as described in, for example, the work "Chemical Reactors: Design, Engineering, Operation; Pierre Trambouze, Hugo Van Landeghem, Jean-Pierre Wauquier; Ed. Technip. 1988."

Thus, relative to these two modes of operation, the invention makes it possible to reduce and to optimize the quantity of scrubbing liquid or solvent(s) to be treated when the latter are to be regenerated and as a result reducing the overall size of the installation, allowing said regeneration. Actually, according to the invention, a smaller portion, or only a portion, optionally variable, of the total quantity of solvent(s) in circulation can be regenerated.

According to another aspect, this invention makes it possible to obtain an intense treatment of gas. The implementation of this invention thus makes it possible finally to obtain a gas that is very low in impurities. According to the invention, the final treatment phase is carried out between a fresh or regenerated solvent, i.e., that contains very little or no impurities, and a gas that is low in said impurities by a fresh solvent. Such an arrangement makes it possible to improve significantly the quality of the gases that are finally obtained.

Finally, this invention makes it possible to monitor at any moment the composition of the solvent upon contact with the gas to be treated, for example based on the degree of purity of the latter.

More particularly, this invention relates to an installation for treatment of gas that is loaded with impurities by at least one liquid phase.

The installation comprises:
a) a column that comprises
means for introducing gas that is loaded with impurities at one end of said column, means for drawing off depolluted gas at the other end of the column, and, placed from upstream to downstream in the direction of circulation of the liquid phase or phases, at least:
- a first internal comprising means for introducing and distributing a liquid phase into the upper portion of the column,
- a first bed that comprises a packing and/or solid catalytic particles,
- a second internal that comprises means for gas/liquid separation of the mixture that consists of the liquid that is obtained from the first bed and the gas that is present or entrained with this liquid, first means for collecting and evacuating at least a portion of the separated liquid phase, means for passing through the second internal of the gas that circulates in the column and means for injecting, mixing and distributing an outside liquid phase with said gas,
- at least a second bed that comprises a packing and/or solid catalytic particles,
- second means for collecting and evacuating the liquid phase that is obtained from the bed that is located at the bottom of the lower portion of the column, b) Means for recycling at least a portion of the liquid phase that is collected in the lower portion of the column to the first internal and/or the second internal.

According to a first embodiment of the installation, the means for introducing gas that is loaded with impurities are placed at the upper end of said column such that the advance of the liquid and the gas is carried out at co-current in the column and the second means for collecting and evacuating at least a portion of the liquid phase at the outlet of the column are connected to the first internal.

According to this method, the recycling means can also comprise a regeneration device that is fed by at least the liquid phase that is obtained from the first and/or second means for collecting and evacuating, and means for injecting at least a portion of the regenerated liquid phase that is obtained from the regeneration device to the second internal.

In addition, the installation according to this first method can comprise means for mixing a portion of the regenerated liquid phase that is obtained from the regeneration device with at least a fraction of the liquid phase that is collected at the outlet of the column that is recycled to the first internal.

According to a second possible embodiment, the means for introducing the gas that is loaded with impurities are placed at the lower end of said column such that the advance of the liquid and the gas is carried out at counter-current in the column, and the second means for collecting and evacuating the liquid phase at the outlet of the column are connected to second internal (3).

According to this second method, the recycling means can comprise a regeneration device that is fed at least by the liquid phase that is obtained from the first and/or second means for collecting and evacuating, and means for injecting at least a portion of the regenerated liquid phase that is obtained from the regeneration device to the first internal. One advantage of this second method is that the capacity for scrubbing and collecting impurities of the liquid is optimally used by making it circulate in the lower portion of the column, which makes it possible to reduce the flow of liquid sent to the regeneration. The liquid that is sent to the top of the column is the liquid that is regenerated to maximize the clean-up of the gas.

In addition, the installation according to this second method can comprise means for mixing a portion of the regenerated liquid phase that is obtained from the regeneration device with the liquid phase that is collected at the outlet of the column and recycled to the second internal.

Most often, the successive beds comprise a packing of the bulk, structured, monolithic or metallic foam or ceramic type, or plates.

Advantageously, this installation also comprises means for monitoring the flow of liquid that circulates in the recycling means and/or in the mixing means and/or in the means for injecting the regenerated liquid phase that is obtained from the regeneration device to the first internal and/or the second internal.

The installation according to the invention can comprise a succession of beds and internals whose number is between 2 and 10.

The installation can also comprise one or more heat exchangers placed on the means for introducing liquid into the first internal.

According to a third embodiment, the invention also relates to an installation for treatment of a gas by two liquid phases of a different chemical nature in which:
- the first means for collecting and evacuating from the second internal are connected to means for introducing and distributing a first liquid phase into the first internal,
- the second means for collecting and evacuating a liquid phase that is collected at the lower outlet of the column are connected to means for introducing a second liquid phase to the second internal.

According to this third method, a regeneration device can be inserted in the connecting means between the first means for collecting and evacuating from the second internal and the means for introducing and distributing the first liquid phase into the first internal and/or a regeneration device is inserted into the connecting means between the second means for collecting and evacuating a liquid phase that is collected at the outlet of the column and the means for introducing a second liquid phase to the second internal.

At the bottom of the column, the installation can also comprise means for decanting and drawing off a liquid phase whose density exceeds that of the initial liquid phase and that consists of or is generated by impurities, such as liquid sulfur.

In a variant of this third method, the invention also relates to an installation and a process for treatment of a counter-current gas by a liquid in which a first liquid phase of treatment is fed to the top of the column above the first internal, and a second liquid phase that undergoes a different kind of treatment from the first is fed to the lateral portion of the column at the level of the second internal. This makes it possible to adapt the quality of the treatment liquid to the impurity levels that are present. It is also possible to eliminate sequentially different impurities (for example CO2 and H2S) with liquids that have different affinities for these impurities, so as to carry out specific regenerations.

According to a preferred variant, a waste liquid is drawn off by at least the second means for collecting and evacuation; the waste liquid is regenerated to produce, on the one hand, a liquid that is regenerated in a relatively intense way, and, on the other hand, a liquid that is regenerated in a relatively restrained way; said liquid that is regenerated in a relatively intense way is fed to the top of the column at the level of first internal (2), and said liquid that is regenerated in a relatively restrained way is fed to the lateral portion of the column at the level of second internal (3). This variant makes it possible to use only a partial regeneration, less costly for eliminating the majority of the impurities, and to limit the flow of liquid that is regenerated in a relatively intense way (for example at higher temperature and/or at lower pressure for monoethanolamine or diethanolamine solutions), whereby this intense regeneration is useful for the final clean-up of the gas.

The installation or the process can be applied to, for example, the treatment of an acid gas that comprises at least one of the following compounds: $H_2S$, $SO_2$, $CO_2$, COS, $CS_2$ or to the processes that use at least one liquid phase and at least one gaseous phase in at least one stage of separation, purification or chemical transformation.

To facilitate the understanding of the invention, FIGS. 1 to 4 provide non-limiting embodiments of installations according to the invention that are equipped with a first liquid distribution internal placed, for example, at the top of the column, upstream from a first packing bed, a second distribution internal according to the invention, and a second packing bed. In this description, the terms upstream and downstream relate to the direction of circulation of the liquid phase. Of course, without exceeding the scope of the invention, a catalytic solid particle bed could be used instead of the packing bed.

Figure 2:
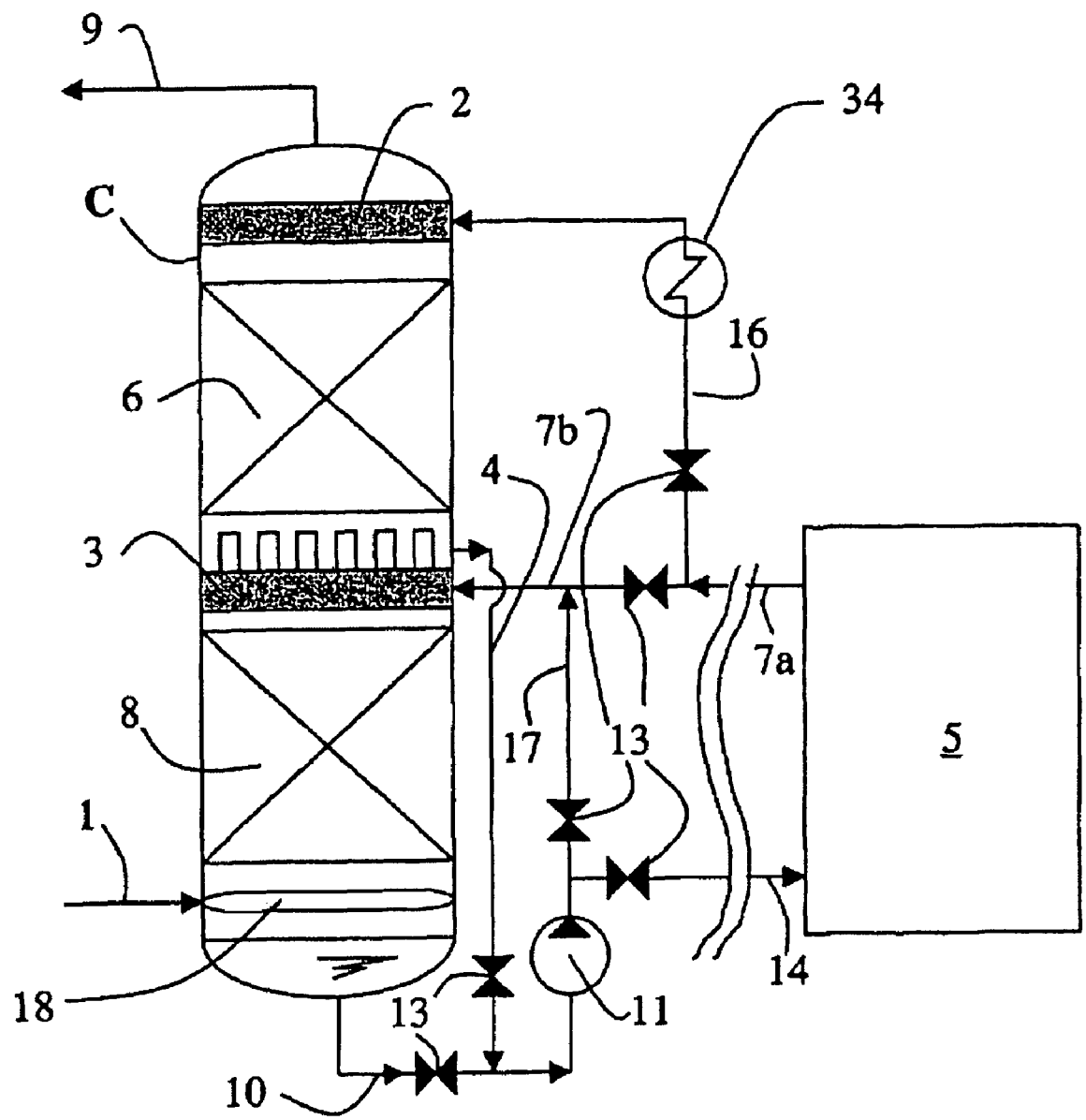
Figure 3A:
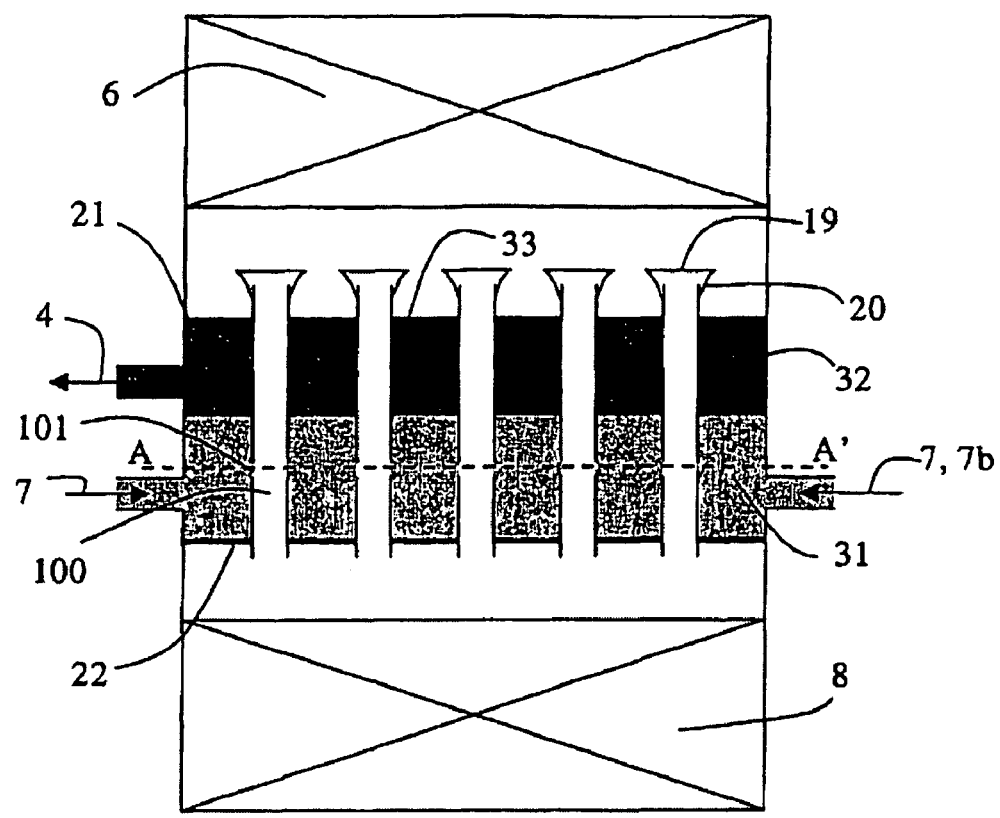
Figure 3B:
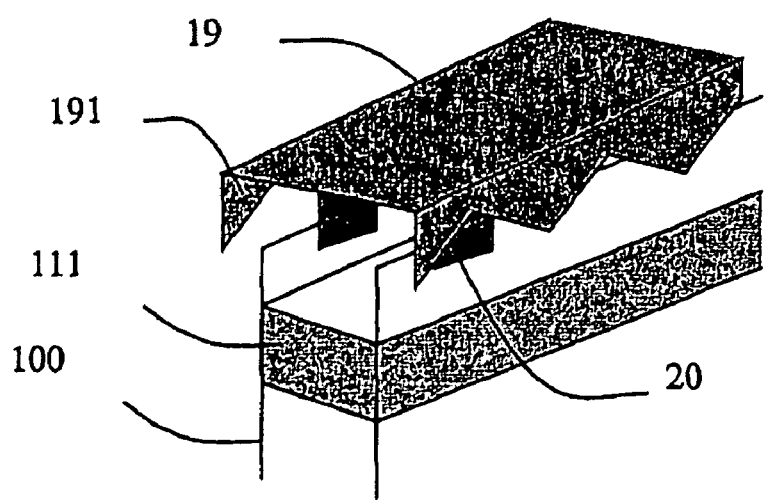
Figure 4A:
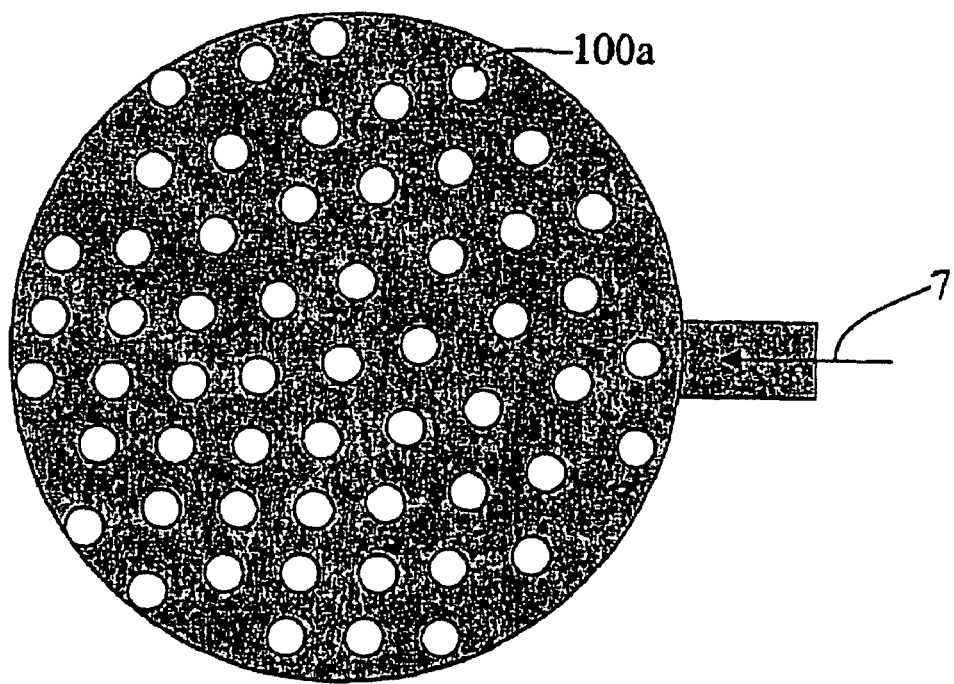
Figure 4B:
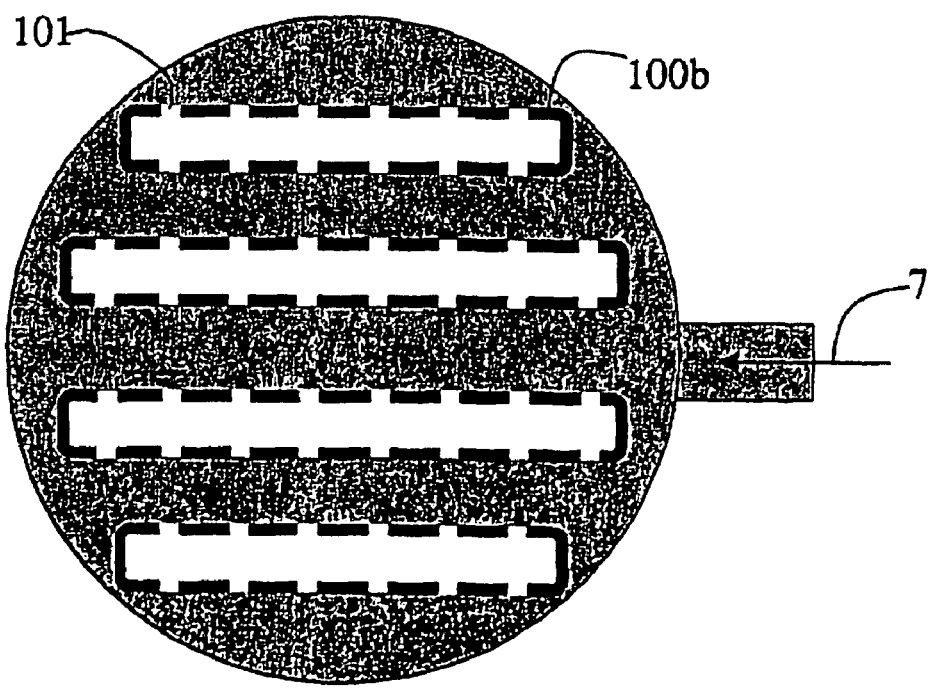

In particular,
  according to a first embodiment of the invention, FIG. 1 relates to the description of a column that operates in downward co-current liquid/gas flow,
  according to a second embodiment of the invention, FIG. 2 relates to the description of a column that operates in counter-current liquid/gas flow,
  FIGS. 3a and 3b illustrate embodiments of the second distribution internal according to the invention,
  FIGS. 4a and 4b show a diagram of a section of said second distribution internal along axis A-A' of FIG. 3a to illustrate two possible arrangements of the passage sections of gaseous and liquid phases within said second internal.

FIG. 1 shows a diagram of a column C in which this process can be implemented. This installation can have, for example, the function of eliminating at least partially acid compounds contained in a crude gas by a liquid solvent, whereby said solvent is then regenerated according to techniques that are well known to one skilled in the art. By way of example, it is possible to use an aqueous solution with 15 to 30% by weight of monoethanolamine or diethanolamine.

The gaseous phase that is to be treated, also called crude gas, is introduced at the top of the column via a line 1, upstream from a distribution internal or a distributor plate 2, into which a liquid phase is introduced and mixed with the gaseous phase. Distributor plate 2 is of a known type, for example according to the technology that is described in the application EP 1,180,393. The two-phase mixture that is thus formed is then distributed radially within the column in a uniform manner toward a bed 6 that contains a packing of a given type (bulk, structured, monolithic or metallic foam or ceramic), in which the separation of the impurities, such as, for example, acid gases, is carried out. The gas that is low in impurities then passes through a second distribution internal 3 that also comprises first means for collecting liquid whose possible embodiments are provided by FIGS. 3a and 3b.

After separation of the gaseous phase, the liquid that is loaded with impurities is recovered at said internal 3 and evacuated via line 4.

The gas that is low in impurities is then brought into contact within internal 3 with a fresh liquid, i.e., the regenerated liquid solvent that is obtained from a regeneration device 5 that is connected to internal 3 via a line 7.

The thus formed gas/liquid mixture is then distributed upstream from a second bed 8 that contains a packing of a type that is identical to or different from that of bed 6 (bulk, structured or monolithic, metallic foam or ceramic). The purified gas at the outlet of bed 8 is evacuated via a line 9; the liquid that concentrates the impurities is evacuated via a line 10.

The liquid that is taken at the bottom of the column via line 10 is then put into circulation via a pump II that sends a fraction of the liquid to the regeneration device via a line 14, whereby the remaining fraction is recycled directly and without treatment to the top of column C via a line 15 and distributor plate 2. According to a very particular embodiment of the invention, for example when the solvent is used without recycling or in a transitory manner, all of the liquid can be recycled without treatment to the top of column C. The non-regenerated liquid fraction that is sent directly to the top of column C can make it possible to carry out a first coarse treatment of the crude gas that is highly loaded with impurities.

Another possible embodiment of the invention is possible when, for example, the gas that is to be treated comprises a high proportion of sulfur-containing compounds and/or when certain purification processes end in a new liquid phase that is constituted by or generated by impurities and generally of a density that is higher than the initial liquid phase, most often of liquid sulfur. In this case, additional means for decanting and draw-off are provided according to the invention at the bottom of column (C) of the high-density liquid phase.

According to an embodiment of the invention, it is advantageously possible to mix the non-regenerated liquid fraction that is obtained at the bottom of column C with a regenerated liquid fraction via a line 12, for example by tapping line 7. This mixing thus advantageously makes it possible to adapt the quality of the solvent to the level of impurities that are present in the incoming crude gases.

The liquid that has passed through upper packing bed 6 is then separated from the gaseous phase on the upper portion of internal 3 that comprises a collecting plate, as described, for example, in connection with FIG. 3a.

According to an advantageous embodiment that is illustrated by FIG. 1, the liquid that is collected in internal 3 and loaded with impurities rejoins the liquid that is taken from the bottom of the column via line 10 upstream from the intake of pump 11, whereby a fraction of the liquid is sent into regeneration device 5 via a line 14, and whereby the other fraction is sent directly via a line 15 to the top of column C. According to techniques that are known to one skilled in the art, a system of valves 13 makes it possible to regulate the liquid flows within lines 4, 7, 10, 12, 14, and 15.

According to a possible embodiment of the invention, it is also possible to place one or more heat exchangers 34 on the feed lines of distributor internals 2 and/or 3 in liquid phase, thus making possible the treatment of the gaseous phase at optimum temperatures that are different in each bed of the column.

According to another embodiment of the invention, a solvent of a different chemical nature can be used for each bed, whereby each bed is in this case combined with a fresh regeneration circuit.

FIG. 2 illustrates a column C that operates according to the preferred principle of gas/liquid counter-current flow, whereby the liquid is in a downward phase. In this figure, numbers identical to those of FIG. 1 are attributed to identical means.

This time, the crude gases that are to be treated are introduced at the bottom of column C, via line 1, distributed uniformly over the entire section of the column via a distribution system 18 then evacuated after treatment to the top of the column via line 9. The other elements inside column C remain unchanged relative to those shown in FIG. 1.

The solvents that are loaded with impurities obtained from internal 3 and from the bottom of column C respectively via outside lines 4 and 10 are mixed, put into circulation via pump 11, then separated into a fraction that is sent via a line 14 to regeneration device 5 while another fraction is recycled directly via lines 17 and 7b in internal 3 to be distributed uniformly over the upper portion (downstream portion) of bed 8. This makes it possible to increase the collection of impurities by recycling solvent and to reduce the flow of solvent sent to the regeneration. The regenerated liquid solvent, i.e., essentially free of impurities and obtained from device 5, is introduced partially or completely into column C via lines 7a and 16 that feed internal 2 then distributed uniformly over the upper portion (downstream portion) of bed 6. By this implementation, in the final phase of gas treatment, contact is carried out between the gas that is already low in said impurities by a fresh or regenerated solvent, i.e., that contains no or very few impurities.

According to an embodiment of the invention, it is advantageously possible to mix the non-regenerated liquid fraction that is obtained from the bottom of column C via lines 10 and 17 with a regenerated liquid fraction, for example by tapping a line 7b that is placed on line 7a. This mixing thus makes it possible in an advantageous and flexible way to adapt the quality of the solvent to the level of impurities present in the incoming crude gases.

Just as for a co-current operation and without exceeding the scope of the invention, the counter-current installation as it was just described can be adapted to the gaseous phase treatment at different temperatures in each bed of the column or to the use for each bed of a solvent of a different chemical nature via heat exchange means 34.

FIGS. 3a and 3b show a diagram of possible embodiments of distribution internal 3 mentioned above.

In a preferred way according to the invention, the installation is such that the second internal comprises a number of pipes 100 that are vertical shafts for passage of gas, disturbed over the section of the column, whereby these shafts are pierced by lateral holes in the lower portion at the level of the distribution of the outside liquid phase, and are not pierced by lateral holes in the upper portion, at the level of the first means for collecting and evacuating liquid. This arrangement is very advantageous because it makes it possible to be able to send the gas through in a distributed way via the same means that make it possible to distribute the liquid into the lower portion of the internal and to preserve the collecting of liquid in the upper portion of the internal. The use of a number of shafts and not a single central shaft for passage of gases makes it possible not to destroy the quality of liquid distribution below internal 3.

More specifically, in FIG. 3a, internal 3 comprises two stages 31 and 32 that are hermetically separated by a wall 21. Stages 31 and 32 are traversed by shafts or pipes 100. Pipes 100 can be full-section without exceeding the scope of the invention. For example, they can have a circular section as shown by the cutaway view of FIG. 4a or a rectangular section as illustrated by FIGS. 3a and 4b.

Upper stage 32 is delimited in its lower portion by wall 21 and open in its upper portion on the downstream portion of first bed 6. This stage allows the separation of gaseous phases and liquid phases as well as the collection of the liquid that is obtained from bed 6. This stage also makes possible the confinement of possible solid particles that are present in the liquid or the initial gas close to wall 21 and consequently to avoid the collapse of the installation as a whole, thus interfering with its proper operation. Liquid retention actually promotes the sedimentation of possible solid particles. The particle bed can then be cleaned during normal shutdowns.

The liquid that is obtained from bed 6 just fills stage 32. The sizing of this stage as well as the height of the pipes within stage 3 are optimized according to techniques that are well known so that liquid level 33 is always less at the inlet of pipes 100. The installation of such a level within stage 32 makes possible its easy draw-off to the recycling pump via line 4.

Upper stage 32 is traversed hermetically via pipes 100. Pipes 100 comprise a cap 19 that prevents any passage of liquid. These caps are supported by, for example, support feet 20 that are welded to the pipe.

In all of the cases (co-current or counter-current), it is preferable that caps 19 be provided with edges 191 (shown with notches in FIG. 3b) and that coalescer systems 111 be installed to prevent the liquid that is obtained from upper bed 6 from being able to access lower bed 8.

In the case of a counter-current application, for example when two solvents that are different on account of their chemical nature and/or their purity or two different temperatures are used for each bed, it is important that the liquid that is obtained from lower bed 8 not be entrained via the gas to the upper portion to prevent mixtures or an essentially uniform temperature. For this purpose, it is possible, as shown in a diagram in FIG. 3b, to carefully install coalescer-type systems 111 that are well known to one skilled in the art that make it possible to trap liquid drops and consequently to prevent their entrainment with the gas to the upper portion of column C.

Lower stage 31 consists of a compartment that is hermetically delimited by the vertical walls of column C, on the one hand, and by essentially horizontal walls 21 and 22, on the other hand. Lower stage 31 is fed with liquid via lines 7 (FIG. 1) or 7b (FIG. 2). The chamber is kept loaded, i.e., the liquid essentially fills the chamber to ensure proper operation of the installation. The liquid flows toward the inside of pipes 100 via openings 101 that are pierced in said pipes.

Said pipes can have any suitable shape, for example cylindrical shafts 100a or rectangular pipes 100b as shown in diagrams respectively via FIGS. 4a and 4b.

The gas passes through internal 3 via shafts 100a or pipes 100b by flowing either from the bottom up in the case of counter-current mode or from the top down in the case of co-current mode. The use of rectangular pipes according to FIG. 4b is particularly suited in the case of a strong constraint of a loss of pressure on the gas, whereby the passage section can be essentially enlarged relative to the cases of cylindrical shafts. In addition, this configuration has an easier assembly, whereby the number as well as the length of welds between the two end plates delimit the chamber and the upper and lower peripheries of the shafts or pipes are reduced.

According to a possible embodiment, this invention makes possible the use of two different solvents that exhibit a particular affinity for some of the acid components described above or the same solvent with purity and/or temperature conditions that are different in one and the same column.

The installation, as it was just described, thus advantageously can replace the standard collecting and distributing systems thanks to a gain in terms of the quality of distribution and compactness, as well as in terms of simplicity of operation.

Thus, relative to the process that is described in U.S. Pat. No. 6,666,908, this invention allows the economy of a column and/or to reduce the number of beds, which considerably decreases the investment necessary to the implementation of this invention. It also makes it possible to obtain a maximum clean-up, while reducing the flow of solvent to be regener-

The invention claimed is:

1. Installation for treatment of a gas that is loaded with impurities by at least one liquid phase that comprises:
   a) a column (C) having an upper end and a lower end that comprises
      means (1) for introducing gas loaded with impurities at one end of said column,
      means (9) for drawing off depolluted gas at the other end of column (C),
      and within said column (C) at least:
         a first internal (2) comprising means for introducing and distributing a liquid phase comprising a solvent for said impurities into the upper portion of column (C),
         a first bed (6) comprising packing,
         a second internal (3) comprising means for gas/liquid separation (19, 20, 21) of a mixture comprising liquid obtained from the first bed and gas present or entrained with said liquid; first means for collecting and evacuating (32, 4) at least a portion of the separated liquid phase, means (100) for passing through said second internal (3) gas circulating in the column; and at a level in said column (C) means (31, 101) for injecting, mixing and distributing an outside liquid phase with said gas, said second internal comprising a number of vertical shafts for gas passage distributed over a cross section of the column, said shafts being provided with lateral holes in the lower portion at the level of the distribution of the outside liquid phase, and lacking lateral holes in the upper portion, at the level of said first means (32, 4) for collecting and evacuating,
         at least a second bed (8) comprising a packing,
         second means (10) for collecting and evacuating the liquid phase obtained from bed (8) located at the bottom in the lower portion of the column, and
   b) means (11, 15, 17, 7b) for recycling at least a portion of the liquid phase that is collected in the lower portion of the column to said first internal (2) and/or to said second internal (3), and wherein
   said means (1) for introducing the gas that is loaded with impurities are placed at the lower end of said column (C) allowing advance of the liquid and the gas to be run at counter-currently in the column and in which said second means (10) for evacuating the liquid phase in the lower outlet of column (C) are connected to said second internal (3), and wherein the
   recycling means comprises a solvent regeneration device (5) fed at least by the liquid phase that is obtained from the second means (10) for evacuating the liquid phase, and means for injecting at least a portion of regenerated solvent (7a, 16—FIG. 2) obtained from said solvent regeneration device (5) to the first internal,
   further comprising means (7a, 7b, 17—FIG. 2) for mixing a portion of the regenerated solvent obtained from said solvent regeneration device (5) with the liquid phase that is collected at the lower outlet of column (C) and recycled to said second internal (3).

2. An installation according to claim 1, further comprising means (13) for monitoring the flow of liquid circulating in the means for recycling or in the means for mixing and/or in the means for injecting the regenerated solvent obtained from said solvent regeneration device (5) to first internal (2) or second internal (3).

3. An installation according to claim 1, comprising a succession of beds (8) and internals (3) whose number is between 2 and 10.

4. An installation according to claim 1, comprising one or more heat exchangers (34) that are placed in the means for introducing liquid into first internal (2).

5. An installation according to claim 1 for treatment of gas by two liquid phases of a different nature and/or chemical purity in which
   first means (32, 4) for collecting and evacuating liquid from second internal (3) are connected to means for introducing and distributing a first liquid phase into first internal (2),
   second means (10) for collecting and evacuating liquid at the lower outlet of column (C) connected to means for introducing a second liquid phase to second internal (3).

6. An installation according to claim 5, in which a solvent regeneration device is inserted in the means for connecting between first means (32) for collecting and means (4) for evacuating the second internal (3) and means for introducing and distributing the first liquid phase into the first internal (2) and/or the solvent regeneration device is inserted into the connecting means between the second means (10) for collecting and evacuating the liquid phase that is collected at the lower outlet of column (C) and the means for introducing liquid to second internal (3).

7. An installation according to claim 1, further comprising, at the bottom of column (C), means for decanting and drawing off a high-density liquid phase in the initial liquid phase comprising or generated by impurities.

8. An installation according to claim 1, wherein the means for introducing gas loaded with impurities is located at the lower end of the column.

9. An installation according to claim 1, further comprising means (13) for monitoring the flow of liquid circulating in the means for recycling or in the means for mixing and/or in the means for injecting the regenerated solvent obtained from said solvent regeneration device (5) to first internal (2) or second internal (3).

10. An installation according to claim 9, comprising a succession of beds (8) and internals (3) whose number is between 2 and 10.

11. An installation according to claim 10, further comprising, at the bottom of column (C), means for decanting and drawing off a high-density liquid phase in the initial liquid phase comprising or generated by impurities.

12. An installation according to claim 1, further comprising solvent regeneration means in communication with the column.

13. An installation according to claim 1, wherein said packing comprises at least one of structured packing, monolithic packing, metallic foam packing and Raschig rings.

14. An installation according to claim 1, supported by an off-shore platform or boat.

15. A process accordingly to claim 2, conducted on an off-shore platform or boat.

16. An installation according to claim 1, further comprising a wall sealing the upper portion from the lower portion within the column except for said vertical shafts passing through both portions.

17. An installation according to claim 1, wherein said means for recycling at least a portion of the liquid phase that is obtained in the lower portion of the column is provided with means for recycling to both the first internal and the second internal.

18. An installation according to claim 16, wherein said means (31, 101) for injecting, mixing and distributing an outside liquid phase with said gas includes conduit for said passing said liquid phase laterally into said column at said level into said lower portion.

19. An installation according to claim 16, said first means for collecting and evacuating separated liquid phase comprising conduit for passing liquid from said upper portion in the column.

20. An installation according to claim 18, said first means for collecting and evacuating separated liquid phase comprising conduit for passing liquid from said upper portion in the column.

21. A process for counter-current gas treatment by a solvent in an installation comprising
    a) a column (C) having an upper end and a lower end that comprises
        means (1) for introducing gas loaded with impurities at one end of said column,
        means (9) for drawing off depolluted gas at the other end of column (C),
        and within said column (C) at least:
            a first internal (2) comprising means for introducing and distributing a liquid phase comprising a solvent for said impurities into the upper portion of column (C),
            a first bed (6) comprising packing,
            a second internal (3) comprising means for gas/liquid separation (19, 20, 21) of a mixture comprising liquid obtained from the first bed and gas present or entrained with said liquid; first means for collecting and evacuating (32, 4) at least a portion of the separated liquid phase, means (100) for passing through said second internal (3) gas circulating in the column; and at a level in said column (C) means (31, 101) for injecting, mixing and distributing an outside liquid phase with said gas, said second internal comprising a number of vertical shafts for gas passage distributed over a cross section of the column, said shafts being provided with lateral holes in the lower portion at the level of the distribution of the outside liquid phase, and lacking lateral holes in the upper portion, at the level of said first means (32, 4) for collecting and evacuating,
            at least a second bed (8) comprising a packing,
            second means (10) for collecting and evacuating the liquid phase obtained from bed (8) located at the bottom in the lower portion of the column, and
    b) means (11, 15, 17, 7b) for recycling at least a portion of the liquid phase that is collected in the lower portion of the column to said first internal (2) and/or to said second internal (3), wherein said means (1) for introducing the gas that is loaded with impurities are placed at the lower end of said column (C) allowing advance of the liquid and the gas to be run at counter-currently in the column and in which said second means (10) for evacuating the liquid phase in the lower outlet of column (C) are connected to said second internal (3),
    said process comprising feeding a first solvent, in said installation, comprising feeding a first solvent phase for treatment to the top of the column at the level of the first internal (2), and feeding a second solvent phase for different treatment from the first internal to the lateral portion of the column at the level of the second internal (3),
    wherein a waste liquid is drawn off via at least the second means for collecting and evacuating, the waste liquid is regenerated to produce first solvent phase regenerated intensively, and a second solvent phase less regenerated than the first solvent phase; said first solvent regenerated intensively is fed to the top of the column at the level of first internal (2), and said second solvent phase regenerated less intensely is fed to the lateral portion of the column at the level of second internal (3).

22. A process according to claim 21, wherein said gas is an acid gas comprising at least one of the following compounds: $H_2S$, $SO_2$, $CO_2$, COS, $CS_2$.

23. A process according to claim 22, and said solvent phase comprises at least one of monoethanolamine and diethanolamine.

24. An installation according to claim 23, wherein said packing comprises at least one of structured packing, monolithic packing, metallic foam packing and Raschig rings.

25. A process for counter-current gas treatment by a solvent in an installation comprising
    a) a column (C) having an upper end and a lower end that comprises
        means (1) for introducing gas loaded with impurities at one end of said column,
        means (9) for drawing off depolluted gas at the other end of column (C),
        and within said column (C) at least:
            a first internal (2) comprising means for introducing and distributing a liquid phase comprising a solvent for said impurities into the upper portion of column (C),
            a first bed (6) comprising packing,
            a second internal (3) comprising means for gas/liquid separation (19, 20, 21) of a mixture comprising liquid obtained from the first bed and gas present or entrained with said liquid; first means for collecting and evacuating (32, 4) at least a portion of the separated liquid phase, means (100) for passing through said second internal (3) gas circulating in the column; and at a level in said column (C) means (31, 101) for injecting, mixing and distributing an outside liquid phase with said gas, said second internal comprising a number of vertical shafts for gas passage distributed over a cross section of the column, said shafts being provided with lateral holes in the lower portion at the level of the distribution of the outside liquid phase, and lacking lateral holes in the upper portion, at the level of said first means (32, 4) for collecting and evacuating,
            at least a second bed (8) comprising a packing,
            second means (10) for collecting and evacuating the liquid phase obtained from bed (8) located at the bottom in the lower portion of the column, and
    b) means (11, 15, 17, 7b) for recycling at least a portion of the liquid phase that is collected in the lower portion of the column to said first internal (2) and/or to said second internal (3), wherein said means (1) for introducing the gas that is loaded with impurities are placed at the lower end of said column (C) allowing advance of the liquid and the gas to be run at counter-currently in the column, said process comprising feeding a first solvent, in said installation, comprising feeding a first solvent phase for treatment to the top of the column at the level of the first internal (2), and feeding a second solvent phase for different treatment from the first internal to the lateral portion of the column at the level of the second internal (3), wherein a waste liquid is drawn off via at least the second means for collecting and evacuating, the waste liquid is regenerated to produce first solvent phase regenerated intensively, and a second solvent phase less regenerated than the first solvent phase; said first solvent regenerated intensively is fed to the top of the column at the level of first internal (2), and said second solvent phase regenerated less intensely is fed to the lateral portion of the column at the level of second internal (3).

* * * * *